E. F. LIND.
COMBINED CART AND SLED.
APPLICATION FILED FEB. 14, 1911.
1,016,640.
Patented Feb. 6, 1912.
2 SHEETS—SHEET 2.
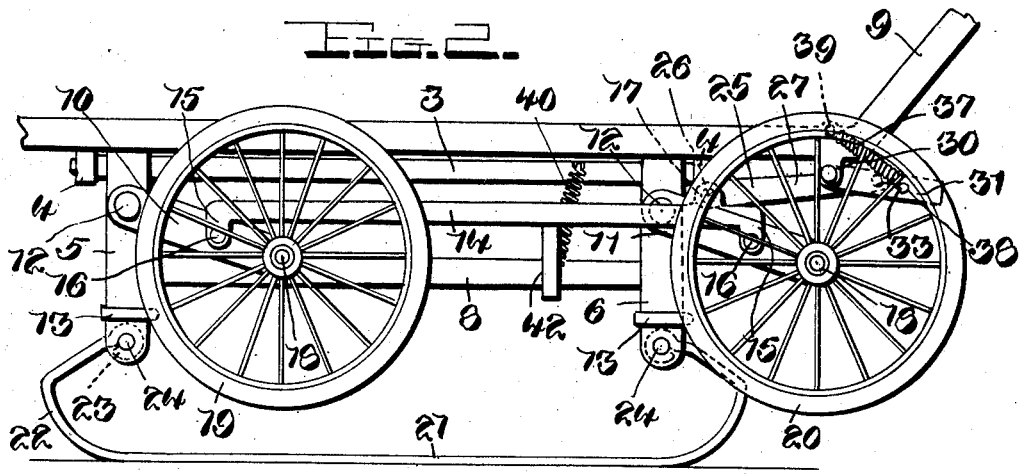
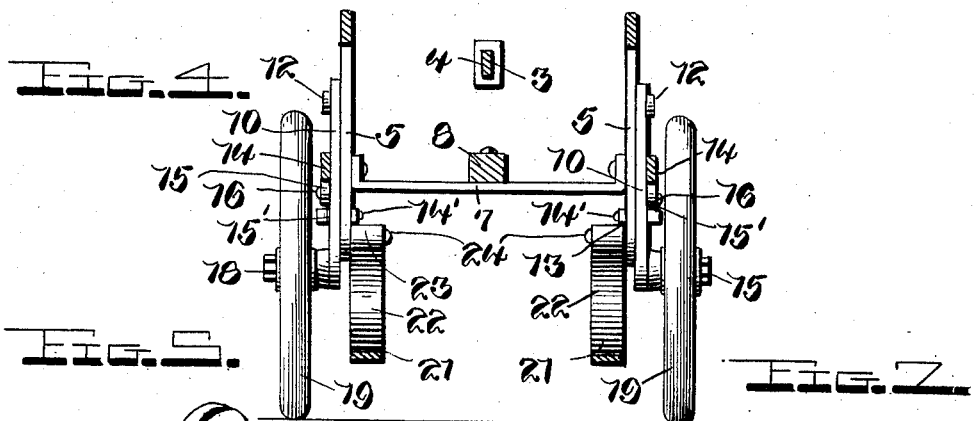
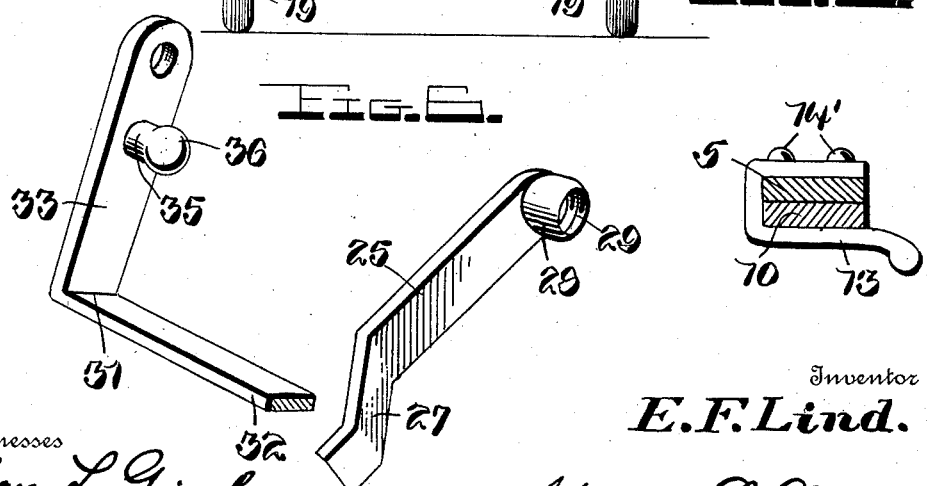
Inventor
E. F. Lind.
Witnesses
By Watson E. Coleman
Attorney

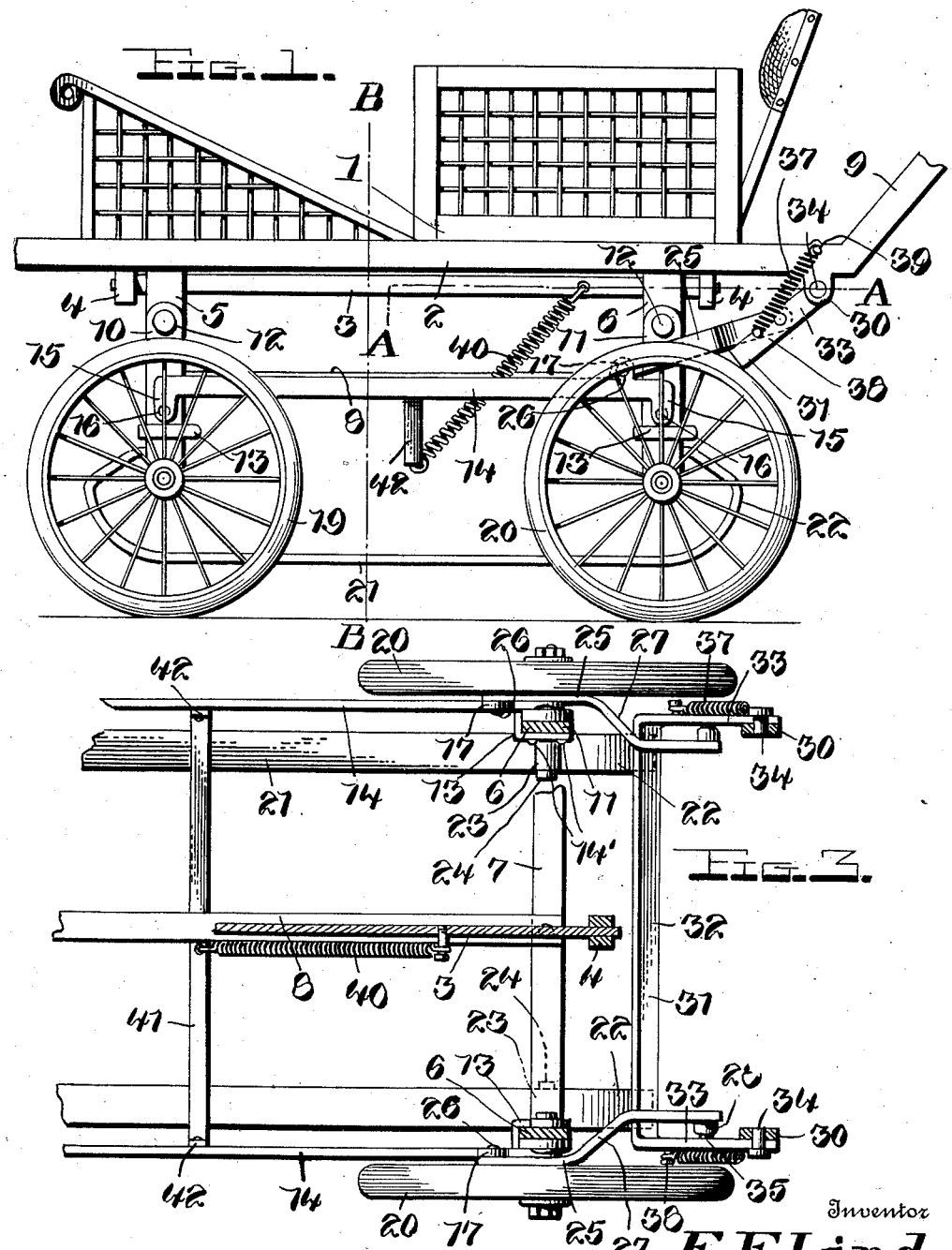

UNITED STATES PATENT OFFICE.

ELMER F. LIND, OF ST. PAUL, MINNESOTA.

COMBINED CART AND SLED.

1,016,640.  Specification of Letters Patent.  Patented Feb. 6, 1912.

Application filed February 14, 1911. Serial No. 608,504.

*To all whom it may concern:*

Be it known that I, ELMER F. LIND, a citizen of the United States, residing at St. Paul, in the county of Ramsey and State of Minnesota, have invented certain new and useful Improvements in Combined Carts and Sleds, of which the following is a specification, reference being had to the accompanying drawings.

This invention is an improved convertible wheeled vehicle and sleigh, the object of the invention being to provide a vehicle, such as a child's go-cart, with means whereby the same may be converted from a wheel vehicle to a sleigh at will and in an instant, the invention consisting in the construction, combination and arrangement of devices hereinafter described and claimed.

In the accompanying drawings,—Figure 1 is a side elevation of a vehicle constructed in accordance with my invention, showing the same in use as a wheel vehicle. Fig. 2 is a similar view of the same, with the wheels elevated, and showing the vehicle in use as a sleigh. Fig. 3 is a horizontal sectional view on the plane indicated by the line A—A of Fig. 1. Fig. 4 is a vertical transverse sectional view on the plane indicated by the line B—B of Fig. 1. Figs. 5, 6 and 7 are detail views.

For the purposes of this specification a vehicle provided with my improved device whereby the same may be used as a wheel vehicle or as a sleigh at will is shown in the accompanying drawings as a child's go-cart. My invention may, however, be employed in connection with vehicles of other types, and I do not desire to limit myself in this particular. The body of the vehicle is indicated at 1, 2 being the bottom thereof. A longitudinally disposed bar 3 is under the bottom of the vehicle and is secured to blocks 4. Front and rear standards 5—6, which are respectively disposed near the front and rear ends of the vehicle, depend from and are secured at opposite sides of the bottom 2 of the body of the vehicle. The said standards are connected together in pairs near their lower ends by cross bars 7, which cross bars are connected together by a longitudinally disposed bar 8. A pair of handles for pushing the vehicle are shown at 9, their lower ends being connected to the rear end of the bottom board 2. Swinging arms 10—11 are respectively pivotally connected at their upper ends to the standards 5—6, the pivots being indicated at 12 and the said swinging arms being disposed on and bearing against the outer sides of the said standards. Substantially U-shaped spring guides and clips 13 are horizontally disposed and have their inner arms secured, as at 14', to the inner sides of the standards, their outer arms being adapted to bear against the outer sides of the swinging arms 10—11 when the latter are in vertical position so that the said spring guides and the clips serve, when the swinging arms 10—11 are in vertical position, to hold them against the outer sides of the said standards. Said spring guides and clips are open at their rear sides and the said swinging arms are hence adapted to turn rearwardly on their pivots to elevated inclined position and to be moved forwardly on their pivots until they are disposed vertically and in alinement with the said standards. The swinging arms 10—11, on opposite sides of the vehicle, are connected together by reach bars 14 which are here shown as provided with downturned end portions 15 which are pivotally connected to the said swinging arms, as at 16. Each reach rod is provided near its rear end with a pair of upwardly extending lugs 17 which are spaced appropriately apart. Stub axles 18 project outwardly from the swinging arms at the lower ends of the latter, and front and rear wheels 19—20 are mounted on the said stub axles. Hence the wheels of the vehicle are carried by the swinging arms 10 and 11 and when the latter are lowered to vertical position the wheels bear on the ground, support the vehicle, and the latter is used as a wheel vehicle.

A pair of sleigh runners 21 are employed, which are here shown as provided with reversely curved and upturned ends 22 constituting springs, the said runners being preferably made of steel or other suitable spring metal and the upturned ends of the runners are formed with eyes 23 through which extend bolts or other suitable devices 24 which serve to secure the said runners to the lower portions of the standards. When the wheels are down and in use for supporting the vehicle, the runners are above and out of contact with the ground. When the wheels are raised the runners bear upon the supporting surface, and serve to support the vehicle.

A pair of links 25 have their front ends pivotally mounted between the pairs of lugs 17, the pivots for the said links being here shown as bolts 26. Each link 25 has an inwardly extending lateral off-set portion 27 and is provided near its rear end on its outer side with a laterally extending boss 28 in which is a socket 29. A pair of lugs 30 which are at the rear end of the bottom board 2 extend downwardly therefrom. A crank yoke 31, comprising a transverse pedal bar 32 and crank arms 33 at the ends of said pedal bar has the end portions of its said crank arms pivotally connected to the lugs 30, as by means of pivot bolts 34 so that the said crank yoke is adapted to swing in a vertical plane. The said crank arms of the crank yoke are provided on their inner sides with inwardly extending pivot or wrist elements 35 which are provided at their inner ends with spherical enlargements or balls 36 which are mounted in the sockets 29 of the links 25 so that ball and socket joints are effected between the said links 25 and the crank arms of the crank yoke, said crank yoke with its crank arms and the said links 25 hence effecting toggle link connections between the body of the vehicle and the swinging arms which carry the vehicle wheels. Coiled retractile springs 37 are connected, as at 38, to the crank arms 33 and their upper ends are connected to the rear ends of the board 2, as at 39. The said springs, when the crank yoke is swung forwardly to lower the wheels by depressing the swinging arms which carry the wheels, draw upwardly on the said crank yoke, maintain the same in elevated position, and with the links 25 bearing on the pedal bar 32 of the crank yoke. In order to raise the wheels so as to cause the vehicle to rest upon its runners, the crank yoke is, by means of the foot, depressed and swung rearwardly, thus causing its crank arms and the links 25 to draw upwardly and rearwardly on the arms 10—11, as shown in Fig. 2. The springs 37 serve to support the crank yoke also in such adjusted position, as will be understood. In order also to support the wheels and their carrying devices in elevated position I provide a spring 40, which is here shown as a coil retractile spring with its upper end connected to the bar 3 and its lower end connected to a cross bar 41 which connects a pair of arms 42 that depend from the central portions of the reach bars 14.

Having thus described my invention, what I claim is:—

1. A vehicle having pivotally mounted wheel supporting elements movable angularly in vertical planes, in combination with an operating and locking lever including a cross bar and crank arms, links pivotally connected to the wheel supporting members and to the crank arms of said lever and disposed in the path of movement of the locking lever, and a spring drawing upwardly on the locking lever and serving, when the wheels are lowered, to hold the locking lever with its cross bar in contact with the said links.

2. In combination with a vehicle body and pivotally mounted wheel supporting elements movable angularly in vertical planes, a locking lever including a cross bar and crank arms, the said crank arms being pivotally connected to the body, a spring connected to the body and also connected to the locking lever at a point to one side of the pivotal axis thereof and links pivotally connected to the wheel supporting members and to the inner sides of the crank arms of the locking lever so that when the locking lever is moved to lower the wheel supporting elements the spring acts to engage the cross bar of the locking lever with the links and co-acts with the locking lever and links to lock the wheel supporting elements in such position.

3. In combination with a vehicle body, wheel supporting elements connected thereto for angular movement in vertical planes, a locking lever pivotally connected to the body, a link pivotally connected to the wheel supporting elements and also to the lever at a point to one side of the fulcrum of the lever so that the lever and the link form a toggle connection between the body and the wheel supporting elements, said lever and link being constructed for mutual engagement to limit the movement of the lever in one direction and a spring connected to the lever and serving, when the same is in opened position, to hold the same in engaged relation with the link.

In testimony whereof I hereunto affix my signature in the presence of two witnesses.

ELMER F. LIND.

Witnesses:
 EMIL W. HELMES,
 HARRIET A. DUERR.

Copies of this patent may be obtained for five cents each, by addressing the "Commissioner of Patents, Washington, D. C."